Patented July 14, 1925.

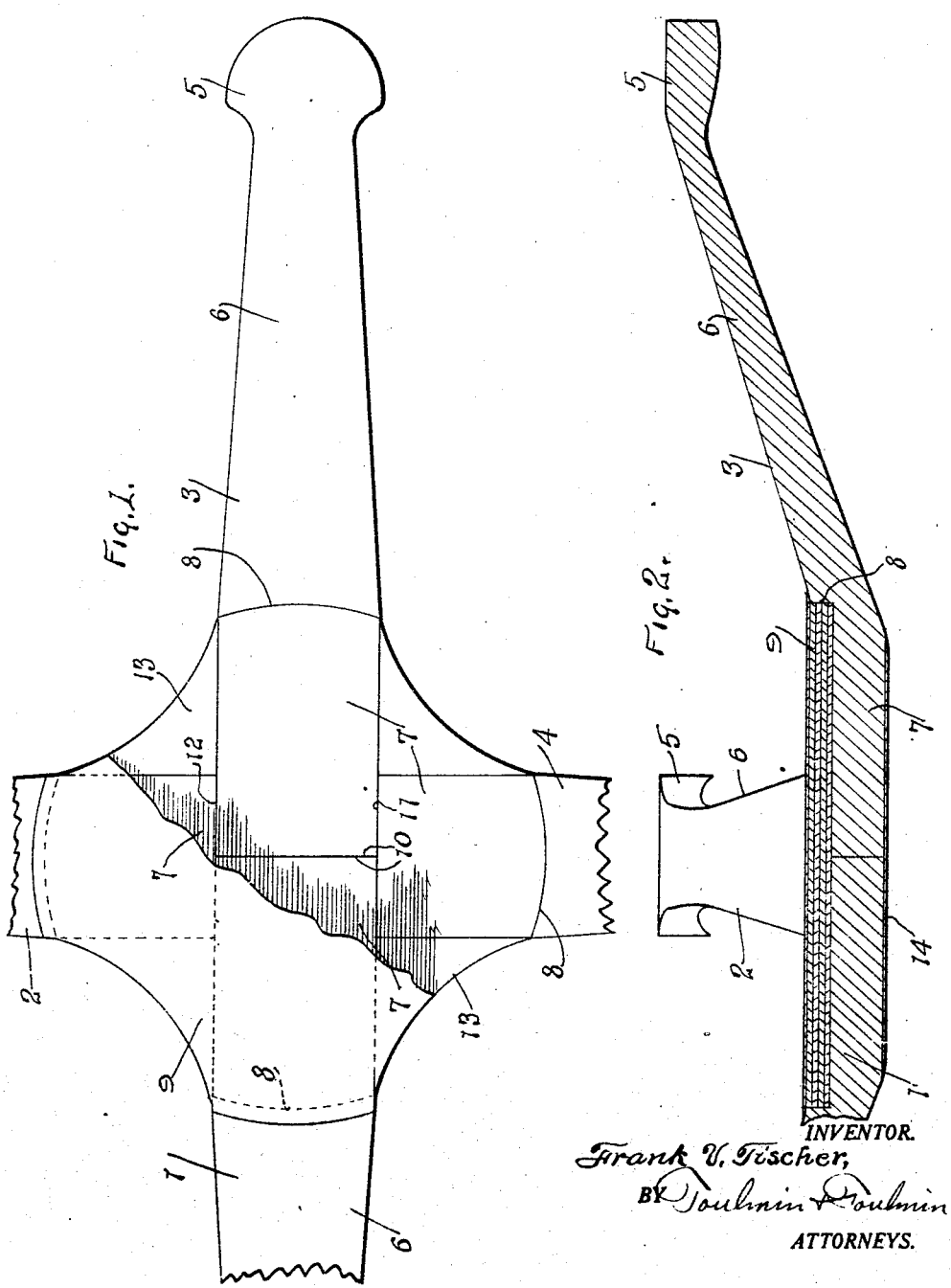

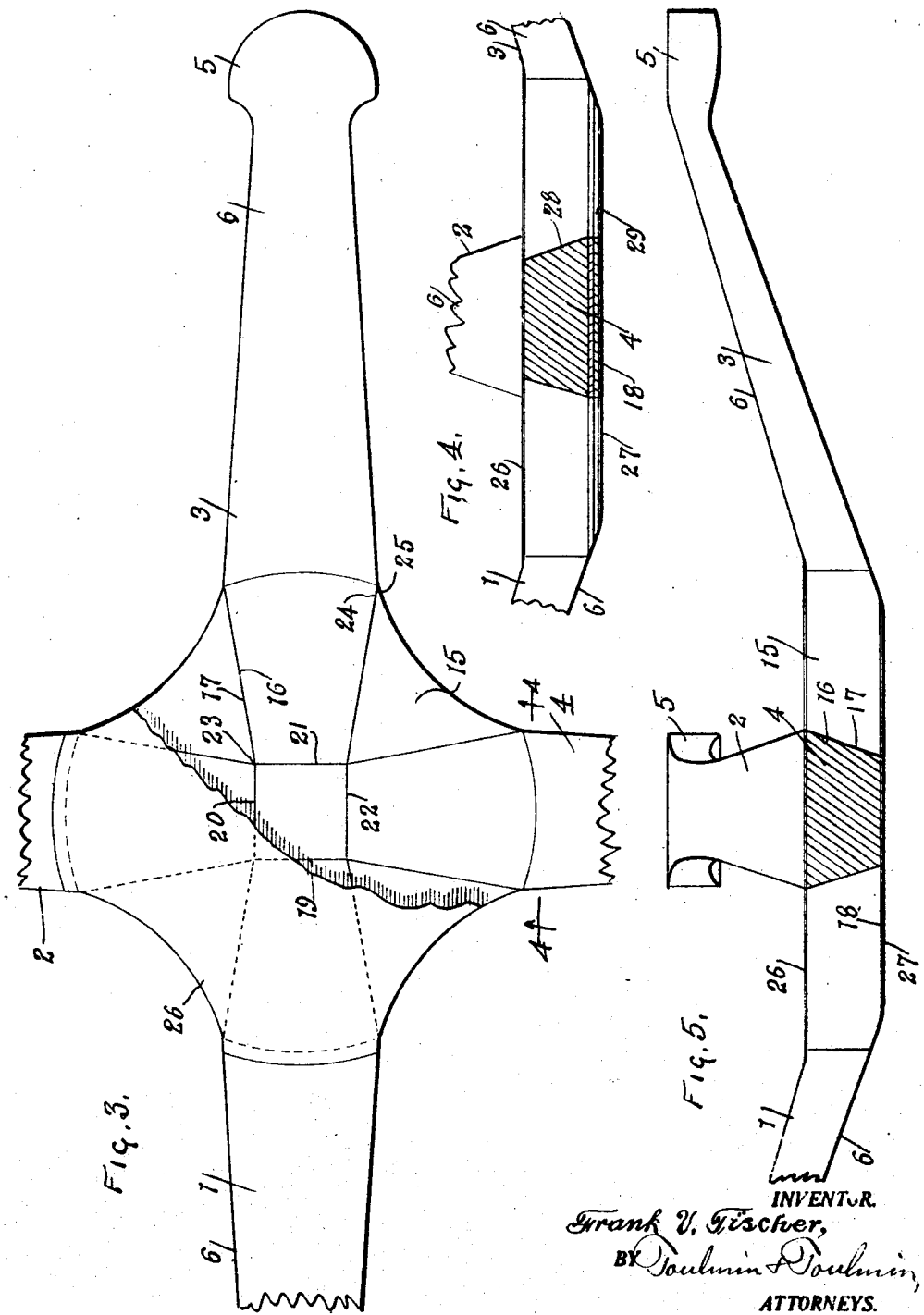

1,545,989

UNITED STATES PATENT OFFICE.

FRANK V. TISCHER, OF DAYTON, OHIO.

STEERING WHEEL.

Application filed October 15, 1923. Serial No. 668,538.

*To all whom it may concern:*

Be it known that I, FRANK V. TISCHER, a citizen of the United States, residing at Dayton, in the county of Montgomery and State of Ohio, have invented certain new and useful Improvements in Steering Wheels, of which the following is a specification, reference being had therein to the accompanying drawing.

My invention relates to steering wheels, and, in particular, to the spider thereof.

It is the object of my invention to provide a spider which may be economically manufactured of relatively cheap materials.

It is an object to provide a spider which may be quickly and easily assembled by unskilled labor, and which will have great strength and rigidity.

It is also an object to provide a spider which will have the customary dish necessary in automobile steering wheels.

It is a further object to provide a spider which will not require complicated cutting or sawing in order to form it of wood or the like.

Referring to the drawings:

Figure 1 is a plan view with the cap laminations partially removed to show the joints of the arms of the spider and brace blocks.

Figure 2 is a section on the line 2—2 of Figure 1.

Figure 3 is a plan view with the center member partially cut away to show the end of the joints.

Figure 4 is a section on the line 4—4 of Figure 3, showing the laid-in joint of an arm with the center member.

Figure 5 is a section of the tapered joint of the arm with the center member.

Referring to the drawings in detail:

1, 2, 3, and 4 designate the respective arms of a steering wheel spider. Each of these arms is composed of a head 5, which is in the horizontal, and is used for joining the arms of the spider to the steering wheel rim; an upwardly and outwardly inclined main arm portion 6, which is located at an angle to the head 5, and also at an angle to the horizontal hub portion 7. If desired, the hub portion may be cut away as at 8, to receive a plurality of laminations 9 for a purpose to be hereinafter described.

It will be observed that each of the hub ends 10 of the arms 1 and 3 abut each other, and are glued at that point. The sides of the arms 1 and 3 adjacent to this joint and overlapping it, are engaged by the ends 11 and 12 of the arms 4 and 2. These engaging ends 11 and 12 are glued to the side walls of the arms 1 and 3. The spaces between the abutting ends 11 and 12 and the side walls of 1 and 3 are filled by brace blocks 13, which are glued in place. These brace blocks extend along the arms to a point where the arms move upwardly out of the horizontal; that is, the brace blocks preferable terminate at the outer end of the hub portions of the arms. A plurality of laminations 9 are preferable inset within the shoulders 8 on top of the hub portions 7 of the arms. These laminations are glued in place. The laminations also overlap the brace blocks.

I thus have an integral overlapping member, overlapping all of the joints in the hub.

On the bottom of the hub portion, a second lamination or veneer embraces the hub portions. This veneer strip is designated 14. The two veneer strips or series of strips thus embrace and are glued to the hub portions and brace blocks.

Turning to the modified form of this spider, it will be observed that in Figures 3, 4, and 5, the arms are of the same form and shape generally as in the preceding figures, save that the hub portions of the arms have a special configuration to fit a corresponding configuration or cut-away portion in the hub block 15. These special hub portions of the the spokes are tapered, having tapered walls 16 engaging with tapered walls 17 of the hub block. These tapered walls of the hub block are associated with the bottom wall 18. The tapered hub ends 19, 20, 21, and 22 of the arms of the spider have their corners 23 adjacent to one another. These tapered ends are also glued into the hub block 15. A joint portion is provided on the spoke arms for engaging with the hub block at a cut-away shoulder 25, as shown in Figs. 3, 4, and 5. In the form shown in Figure 5, which has a dovetailed tapered cut-away portion and hub portions of the arms of similar configurations, all that is necessary in assembling the spider is to coat the hub portions of the arm with glue and drive them into place. For the purpose of decorations, lamination strips or veneers 26 and 27 may be placed on either side of the hub block, but that is unnecessary, so far as strength is concerned.

But in the form shown in Figure 4, where the cut-away portion in the hub block is merely a groove having a bottom wall 18 and outwardly tapering walls 28, then it is preferable, when the arms are glued in these grooves, to have a series of laminations 29 on the surface of the hub block in which the hub portions of the arms have been inserted.

It is understood that in all the forms, after the hub is assembled and dried, a suitable hole is drilled centrally for receiving the steering wheel shaft and the attaching mechanism.

In my invention, I have thus eliminated all necessity for bending or pressing of the parts of the spider, while still securing the dished effect, great strength, and economy of construction, due to utilizing relatively small pieces of wood.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a steering wheel spider, a plurality of arms consisting of hub portions, arm portions, and head portions, said hub portions in two of said arms having their ends abutting, and the ends of the other two arms engaging the sides of the first two arms adjacent the joint of the first two arms.

2. In a steering wheel spider, a plurality of arms consisting of hub portions, arm portions, and head portions, said hub portions in two of said arms having their ends abutting, and the ends of the other two arms engaging the sides of the first two arms adjacent the joint of the first two arms, and brace blocks located in the angles formed by said arms adjacent the joints thereof.

3. In a steering wheel spider, a plurality of arms consisting of hub portions, arm portions, and head portions, said hub portions in two of said arms having their ends abutting, and the ends of the other two arms engaging the sides of the first two arms adjacent the joint of the first two arms, brace blocks located in the angles formed by said arms adjacent the joints thereof, and overlapping means adjacent said hub portions and brace blocks, overlapping the joints of the arms and the brace blocks.

4. In a steering wheel spider, a plurality of arms consisting of hub portions, arm portions, and head portions, said hub portions in two of said arms having their ends abutting, and the ends of the other two arms engaging the sides of the first two arms adjacent the joint of the first two arms, brace blocks located in the angles formed by said arms adjacent the joints thereof, and overlapping means adjacent said hub portions and brace blocks, overlapping the joints of the arms and the brace blocks, said overlapping means being inset in the surface of said arms to prevent lateral movement thereof.

In testimony whereof, I affix my signature.

FRANK V. TISCHER.